United States Patent [19]

Chen

[11] Patent Number: 5,404,781
[45] Date of Patent: Apr. 11, 1995

[54] ANTI-SWAY MEANS FOR A SAW WEB

[75] Inventor: Tony Chen, Taipei, Taiwan, Prov. of China

[73] Assignee: Ko Shin Electric and Machinery Co., Ltd., Taipei, Taiwan, Prov. of China

[21] Appl. No.: 257,123

[22] Filed: Jun. 9, 1994

[51] Int. Cl.⁶ .............................................. B27B 5/29
[52] U.S. Cl. ...................................... 83/823; 83/821
[58] Field of Search ................ 83/821, 823, 824, 825, 83/826, 827, 828, 829

[56] References Cited

U.S. PATENT DOCUMENTS

| | | | |
|---|---|---|---|
| 2,680,992 | 6/1954 | Herbain | 83/828 X |
| 2,760,531 | 8/1956 | Tommila | 83/821 |
| 4,466,323 | 8/1984 | Salomonsson | 83/821 |
| 4,854,207 | 8/1989 | Kirbach et al. | 83/823 |

FOREIGN PATENT DOCUMENTS

| | | | |
|---|---|---|---|
| 799052 | 3/1936 | France | 83/823 |
| 1250536 | 12/1960 | France | 83/828 |
| 371666 | 4/1932 | United Kingdom | 83/828 |

*Primary Examiner*—Eugenia Jones
*Attorney, Agent, or Firm*—Bacon & Thomas

[57] ABSTRACT

An anti-sway device for a saw web mounted on a cutting machine, comprises a pin shaft, a pin sleeve, two nuts, a compression spring, a bronze pressing member, and a bolt. The pin shaft has an internally threaded bore formed at one end for the bolt to thread there into. The pin sleeve has external threads to engage with the two nuts so that the pin sleeve can be fixed to a protective housing of the cutting machine by the nuts, The pin sleeve further has a spring cavity to contain the compression spring therein, By means of the bolt, the bronze pressing member is screwed to the pin shaft and contacts the compression spring while the latter always pushes the bronze pressing member against the saw web to prevent the same from swaying during the cutting operation.

1 Claim, 4 Drawing Sheets

ANTI-SWAY MEANS FOR A SAW WEB

BACKGROUND OF THE INVENTION

The present invention relates to an anti-sway means for a saw web, and more particularly to an anti-sway means mounted on the housing of a cutting machine to prevent the saw web thereof from undesirable swaying during the cutting operation.

In most conventional cutting machines, as shown in FIG. 4, the saw web 42 is mounted on a shaft 41 of the machine. During the cutting operation, the saw web 42 tends to sway or bounce when it contacts with and rubs against the object being cut, producing a somewhat uneven cutting surface. In addition, when the cutting area is considerably large, the saw web also tends to break during the cutting operation. Moreover, the swaying or bouncing of saw web during cutting operation speeds the wearing of saw teeth and shortens the life of saw web. A swaying saw web is also extremely dangerous to the operator which is absolutely not acceptable by nowaday industrial safety requirement.

SUMMARY OF THE INVENTION

It is therefore a primary object of the present invention to provide an anti-sway means for a saw web, especially one which is mounted on a cutting machine, to prevent the saw web from undesirable swaying or bouncing during the cutting operation.

The anti-sway means for a saw web according to the present invention mainly includes a pin shaft having an internally threaded bore formed at one end thereof, an externally threaded pin sleeve into which the pin shaft is inserted, two nuts capable of screwing to the outer periphery of the pin sleeve, a compression spring received in the pin sleeve to surround one rear end of the pin shaft, and a bronze pressing member connected to the pin sleeve at one end opposite to the pin shaft by means of a bolt screwing into the internally threaded bore of the pin shaft.

When two of such anti-sway means are mounted on a housing of a cutting machine at two adequate points with the two bronze pressing members suitably abutting against the saw web, the saw web is prevented from swaying, bouncing or breaking during the cutting operation, and the safety of operator in the process of cutting can thereby be protected.

BRIEF DESCRIPTION OF THE DRAWINGS

The present invention can be best understood by referring to the following detailed description of the preferred embodiment and the accompanying drawings wherein.

DETAILED DESCRIPTION OF THE PREFERRED EMBODIMENT

Figure 1:
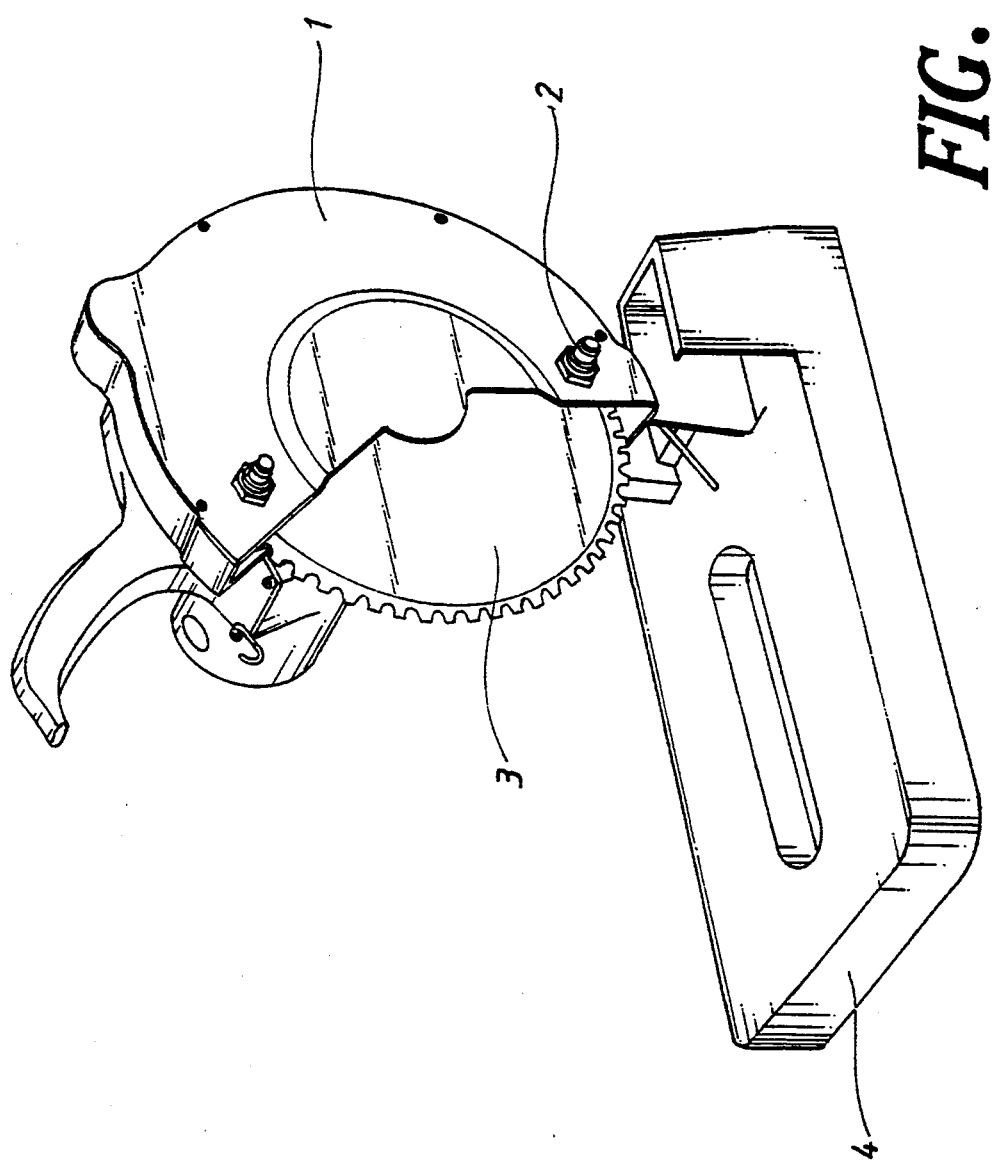
FIG. 1 is a perspective view of a cutting machine on the housing thereof two sets of the anti-sway means of the present invention are mounted.

Please refer to FIG. 1 in which a portable cutting machine having a base 4 is shown. To meet the safety requirement in the mechanical operation of the cutting machine, a protective housing 1 is provided with the machine to cover a saw web 3 thereof. Further, two anti-sway means 2 are mounted on the housing 1 at two adequate positions to prevent the saw web 3 from swaying, bouncing, or deviating during the cutting operation.

Figure 2:
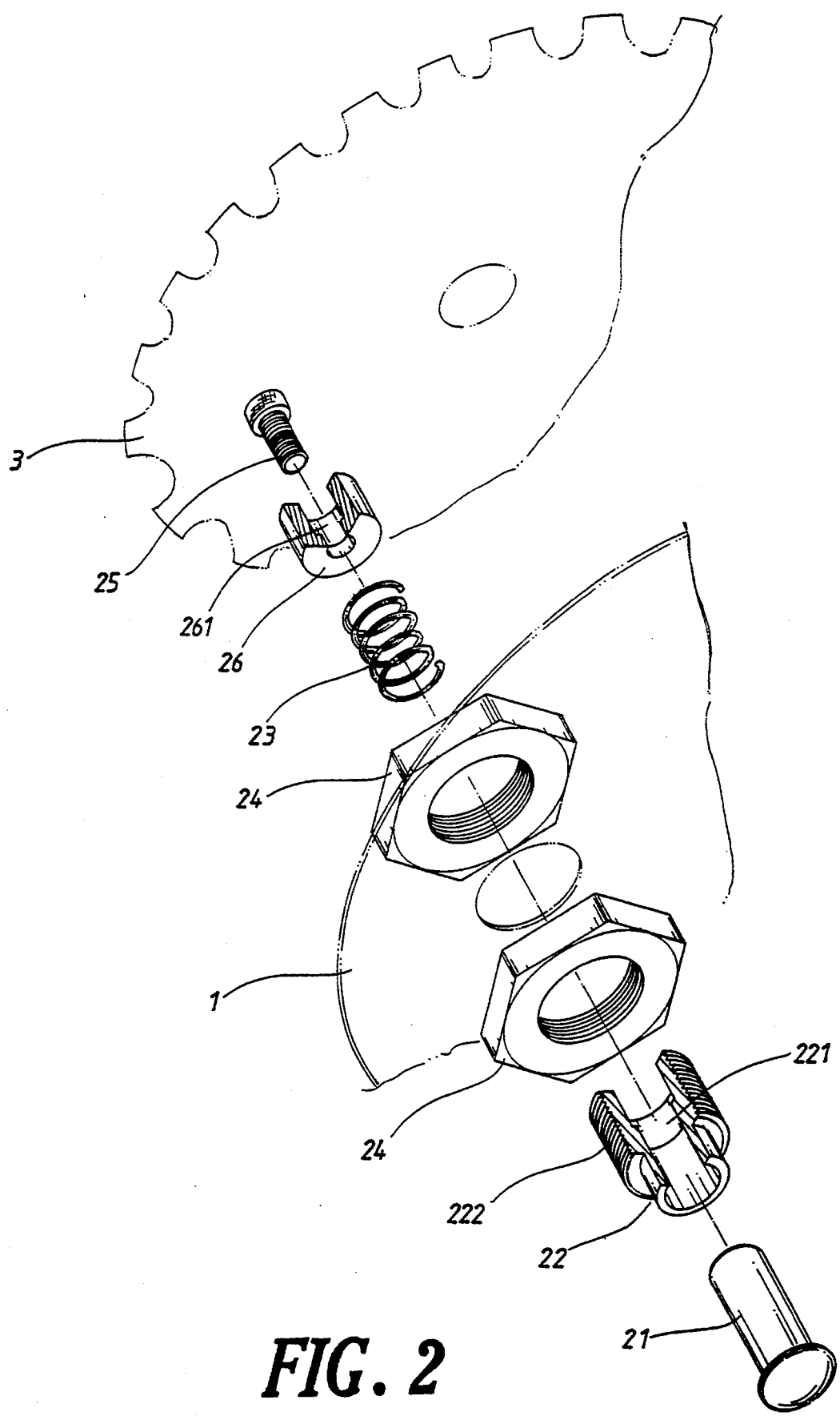
FIG. 2 is a disassembled perspective of the anti-sway means for a saw web of the present invention.
Figure 3:
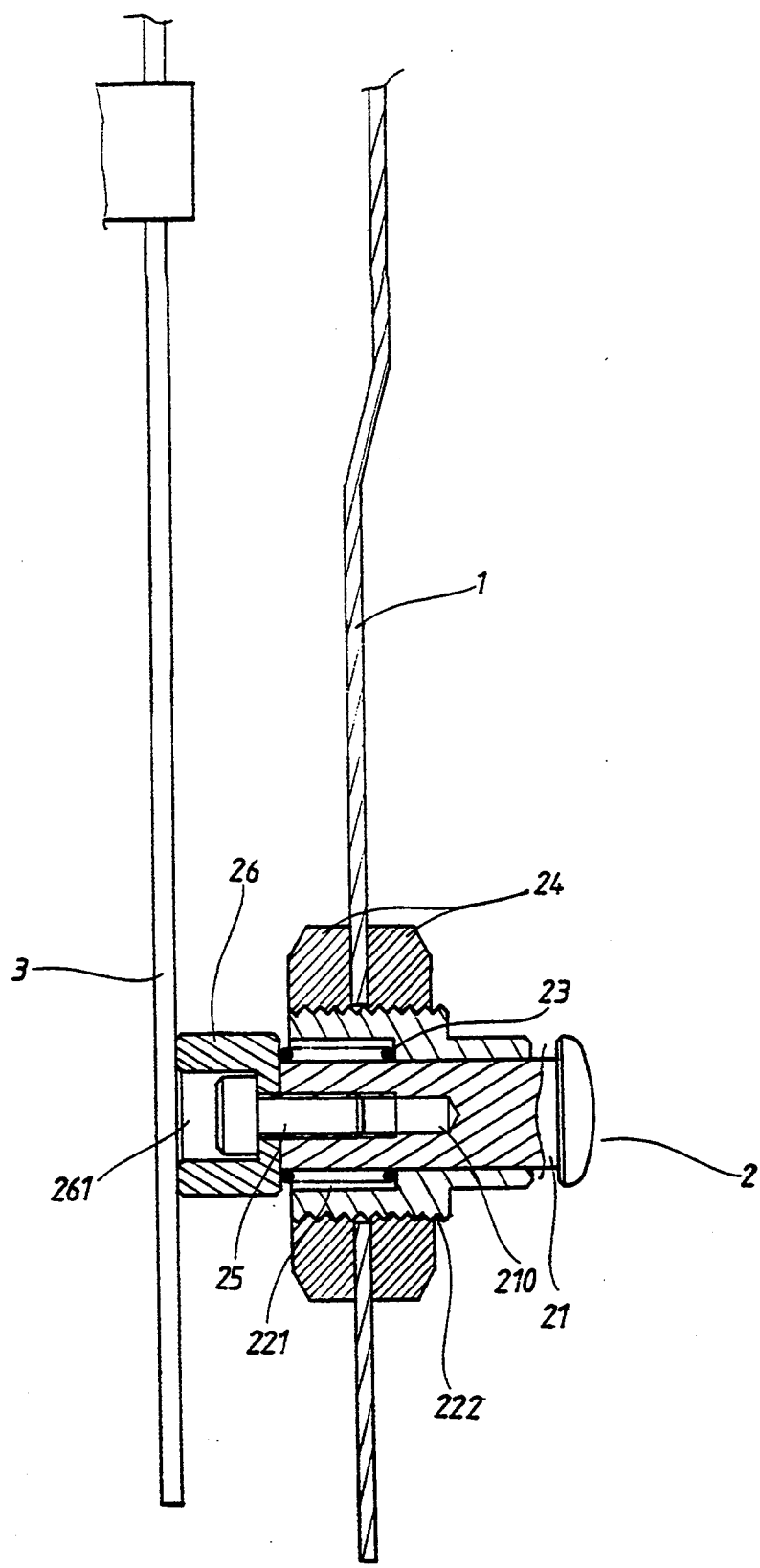
FIG. 3 is an assembled, sectional side view according to FIG. 2.
Figure 4:
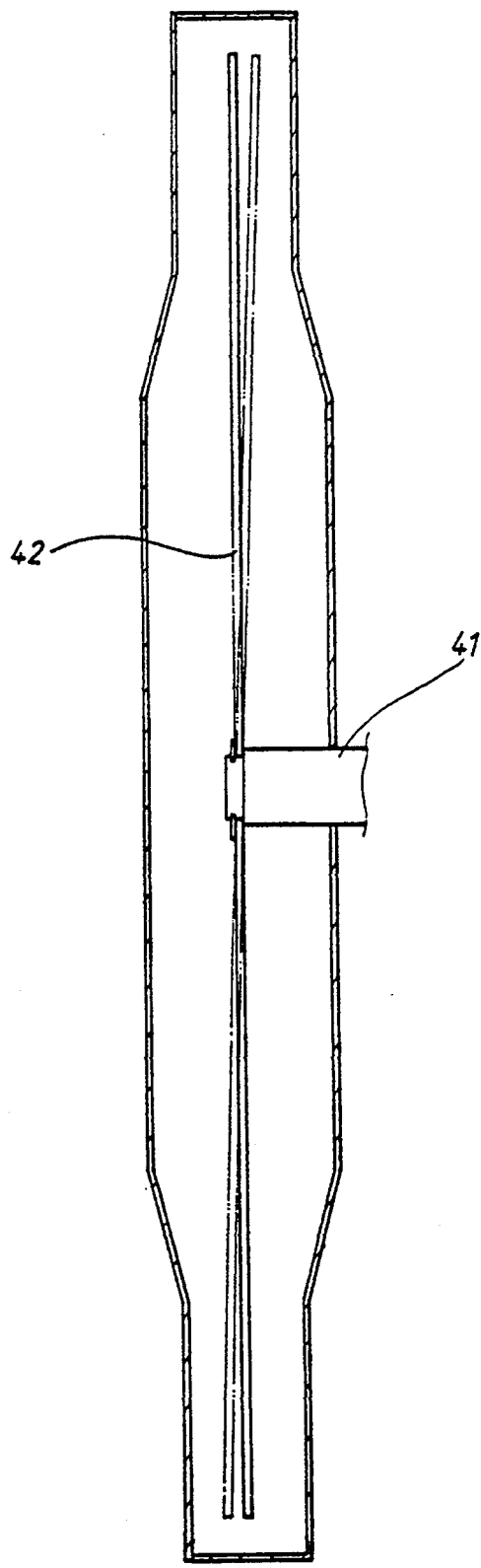
FIG. 4 is a sectional side view showing the swaying of a saw web mounted on a conventional cutting machine.

Please further refer to FIGS. 2 and 3. The anti-sway means 2 for a saw web according to the present invention consists of a pin shaft 21 having a first end facing outside and a second end being formed with an internally threaded bore 210, a pin sleeve 22 having external threads 222 and suitable for fitly receiving the pin shaft 21 therein, a compression spring 23 being disposed in a spring cavity 221 form ed inside the pin sleeve 22 so that the compression spring 23 wraps about the second end of the pin shaft two nuts 24 capable of firmly fixing the pin sleeve 22 to the housing 1 by screwing to the outer periphery of the pin sleeve 22 after the latter is passed through the housing 1, a bolt 25 suitable for threading into the bore 210 of the pin shaft 21, and an annular bronze pressing member 26 having an inner central space 261 through where the bolt 25 can be extended to screw into the threaded bore 210 of the pin shaft 21 and thereby connects the bronze pressing member 26 to the pin shaft 21.

To mount the anti-sway means 2 of the present invention, first screw the pin sleeve 22 through a hole suitably formed on the housing 1 until a predetermined position is reached. Fixedly attach the pin sleeve 22 to the housing 1 by separately screwing the two nuts 24 onto the threads 222 from an inner and an outer side of the housing 1. Put the compression spring 23 into the spring cavity 221 of the pin sleeve 22, insert the pin shaft 21 from its second end into the pin sleeve 22 through an outer end thereof until the pin shaft 21 passes through the compression spring 23, then, extend the bolt 25 into the bronze pressing member 26 via the central space 261 thereof and screw the bolt 25 into the threaded bore 210 in the pin shaft 21 so that the bronze pressing member 26 is connected to the pin shaft 21, with the compression spring 23 being stopped between the pin sleeve 22 and the bronze pressing member 26. That is, the bronze pressing member 26 abuts at its inner end against one side of the saw web 3 and at its outer end against the compression spring 23. The spring force of the compression spring 23 always pushes the bronze pressing member 26 against the saw web 3 and thereby always keeps the saw web 3 in a stable condition without swaying, bouncing or breaking even when it is used to cutting something during the cutting operation.

With the above arrangements, the saw web of a cutting machine shall not sway, bounce, or deviate from its regular position during the cutting operation. The life of the saw web can thereby be prolonged, and undesirable conditions, such as broken teeth, easily worn teeth, and bounced object under cutting, can be avoided.

What is claimed is:

1. An anti-sway device for a saw web for mounting on a housing of a cutting machine, comprising:
    a pin shaft having a first end facing an outer side of said housing and a second end opposite to said first end being formed with an internally threaded bore;
    a pin sleeve having external threads for receiving said pin shaft therein;
    a compression spring being disposed in a spring cavity formed inside said pin sleeve so that said compression spring extends around said second end of said pin shaft;

two nuts firmly fixing said pin sleeve to said housing, said two nuts being screwed to an outer periphery of said pin sleeve after said pin sleeve is passed through said housing, said two nuts being separately screwed to said pin sleeve from an inner and an outer side of said housing, respectively;

a bolt threaded into said bore of said pin shaft; and an annular bronze pressing member having an inner central space through which said bolt extends such that said bolt is screwed into said threaded bore of said pin shaft to thereby connect said bronze pressing member to said pin shaft, wherein said bronze pressing member abuts against said compression spring and is pushed by said spring to press against said saw web to prevent said saw web from swaying, bouncing or breaking during a cutting operation.

* * * * *